United States Patent [19]

Himori

[11] Patent Number: 5,314,958
[45] Date of Patent: May 24, 1994

[54] PROCESS FOR PREPARING GRAFT COPOLYMERS

[75] Inventor: Shunichi Himori, Yokkaichi, Japan

[73] Assignee: Mitsubishi Petrochemical Company Limited, Yokkaichi, Japan

[21] Appl. No.: 888,603

[22] Filed: May 27, 1992

[30] Foreign Application Priority Data

May 27, 1991 [JP] Japan ................................. 3-121409

[51] Int. Cl.$^5$ .......................................... C08F 259/02
[52] U.S. Cl. ................................... 525/256; 525/255; 525/258; 525/259; 525/319; 525/322; 525/324; 525/292; 525/317
[58] Field of Search ............... 525/255, 256, 258, 259, 525/319, 322, 324, 292, 317

[56] References Cited

U.S. PATENT DOCUMENTS

| | | | |
|---|---|---|---|
| 2,987,500 | 6/1961 | Rossetti | 525/255 |
| 3,887,648 | 6/1975 | Takahashi et al. | 525/319 |
| 4,263,426 | 4/1981 | Cooper et al. | 528/500 |
| 4,486,559 | 12/1984 | Murata et al. | 525/322 |
| 4,859,744 | 8/1989 | Lindner et al. | 525/256 |
| 4,910,258 | 3/1990 | Inoue et al. | 525/244 |
| 5,071,936 | 12/1991 | Himori | 528/26 |
| 5,097,007 | 3/1992 | Himori | 528/274 |
| 5,162,444 | 11/1992 | Himori | 525/276 |
| 5,190,989 | 3/1993 | Himori | 525/57 |

FOREIGN PATENT DOCUMENTS

0286376 10/1988 European Pat. Off. .

OTHER PUBLICATIONS

Journal of Macromolecular Science-Reviews in Macromolecular Chemistry, vol. 19, No. 2, 1980.

*Primary Examiner*—Vasu S. Jagannathan
*Attorney, Agent, or Firm*—Armstrong, Westerman, Hattori, McLeland & Naughton

[57] ABSTRACT

Process for preparing a graft copolymer having a high graft copolymer fraction which comprises subjecting a monomer to a polymerization initiation condition resulting from the reaction of a halogen-containing polymer with a combination of a reducing agent and a phase transfer catalyst such as an onium compound thereby to polymerize said monomer.

7 Claims, No Drawings

1

PROCESS FOR PREPARING GRAFT COPOLYMERS

BACKGROUND OF THE INVENTION

1. Field of the Invention

The present invention relates to a process for preparing a graft copolymer. More particularly, it relates to production of a graft copolymer having a feature in the initiator used whereby the grafting process is improved.

From another aspect, the present invention relates to a process for graft copolymerization onto a halogen-containing resin.

2. Related Art

Copolymers in the form of a "comb" having "branch" polymers grafted onto a "backbone" or "trunk" polymer by chemical bonds are generally called graft copolymers including those having "branch" polymers with low molecular weights.

While graft copolymers in the form of a comb are prepared by the method for chemically bonding a polymer for the branch (typically a so-called macromonomer) which, has been preliminarily prepared to a polymer for the backbone, the graft copolymerization method regarded as the conventional method comprises the formation of a polymer for the branch and of the branches by the "in situ" method, that is, specifically the polymerization of a monomer for forming the polymer for the branch in the presence of a polymer for the backbone.

The conventional method includes the methods in which the polymer for the backbone is in a melted form, in a solution or in a dispersion (i.e. emulsion or suspension), which are not always free from problems.

More particularly, while the method for copolymerizing a monomer for, branch polymers in the presence of a polymer for the backbone in a melted state requires no additional process for grafting because the process can be carried out in a melt kneader provided in an extruder, the reaction is carried out at a temperature equal to or higher than the melting point of a given polymer for the backbone, such as about 200° C. and such method cannot be utilized in fact in such cases as the monomer to be used tends to be deteriorated thermally or is volatile or corrosive to metal. While such problems will not be found when the polymer for the backbone is in the form of solution, a problem still remains for recovering a solvent used, which is an organic solvent when the polymer for the backbone is other than water soluble polymers. Furthermore, it is also required to recover a graft copolymer, which is obtained in the form of solution in the solvent used, from the solution for example by the distillation of the solvent used or by the addition of a solvent less compatible with the copolymer unless the graft copolymer produced is used as such in the form of solution.

On the other hand, the method for using a polymer for the backbone in the form of dispersion has no such problems as described above and has already been widely adopted industrially to such cases as production of a so-called ABS resin wherein acrylonitrile and styrene are polymerized in a polybutadiene latex.

In either of the aforementioned methods, a monomer which is used as a monomer for the branch polymer to be polymerized in the presence of a polymer for the backbone, however, tends to polymerize itself instead of "graft" polymerization onto the polymer for the backbone and thus had a problem that the "graft ratio" which is a ratio of the monomer graft copolymerized to the total amount of the monomer used may not be increased sufficiently without special consideration for the initiation of the polymerization of the monomer for the branch polymer. Although no serious problem will occur due to the presence of a non-"graft" polymer which actually forms no "branches" when some advantages are obtained by the presence of the non-graft or non-branch polymer as in the case, for instance, of the ABS resin wherein the copolymer of styrene and acrylonitrile which has not grafted onto the polybutadiene may constitute the resinous portion of the ABS resin, it is desirable to have a graft ratio as high as possible from the standpoint of the intrinsic object of graft copolymers.

SUMMARY OF THE INVENTION

It is an object of the present invention to solve the aforementioned problems and intends to accomplish the object by the use of a particular polymerization initiation system cooperating with the polymer for the backbone for generating a polymerization initiation site on the polymer.

In other words, the process for preparing a graft copolymer according to the present invention comprises subjecting an ethylenically unsaturated monomer to a polymerization initiation condition resulting from the reaction of a halogen-containing polymer dispersed in a polar solvent with a combination of a reducing agent and a phase transfer catalyst selected from the group consisting of onium compounds and ionophore compounds thereby to polymerize said monomer.

In the polymerization initiation system according to the present invention, radicals are generated at the sites to which halogen atoms of a polymer for the backbone have, been bonded and thus the polymerization of a monomer for the branch polymers is initiated at the sites, so that a polymer of the monomer itself should not be actually formed except for the case where such a polymer may be formed by the chain transfer which may occur inevitably.

Although the process is confined to the use of a halogen-containing polymer as the polymer for the backbone, the homopolymer or copolymer of a vinyl or vinylidene halide, which is a specific example of the halogen-containing polymer, is one of the resins widely used, and such a widely used resin as this is improved by the present invention in its blendability with other resins. Furthermore, a halogen-free resin such as polypropylene can be readily halogenated into a "halogen-containing polymer" in the present invention whereby the problems intrinsic to the halogen-free resins such as surface inactivity or poor blendability with the other resins are solved, so that the present invention can be said to have a large utility.

The polymerization method according to the present invention, which is typically emulsion polymerization or suspension polymerization, naturally accompanies none of the above-described problems observed in molten polymerization or solution polymerization.

DESCRIPTION OF THE PREFERRED EMBODIMENTS

Halogen-containing Polymer

The halogen-containing polymer may be theoretically the ones having at least one halogen atom per molecule of the polymer bonded thereto. The polymer chemistry tells that a polymer comprises molecules of a variety of molecular weights owing to the so-called "polymolecularity" of a high molecular compound, and accordingly it is quite possible that some of the molecules in the given "halogen-containing polymer" may have no halogens. After all, the halogen-containing polymer may be the one containing a significant amount of halogen, such as those having a chlorine atom in an amount of 0.1% by weight of the polymer, the upper limit being about 85% by weight.

The halogens may be fluorine, chlorine, bromine and iodine, preferably chlorine and bromine, more preferably chlorine.

The halogen-containing polymer may be the one obtained by the polymerization of a halogen-containing monomer or the halogenated derivative of a halogen-free polymer or a halogen-containing polymer, for example, by direct halogenation or halogen substitution. In this connection, it will be understood that the polymer to be halogenated can be a polymer already containing a halogen atom. Also, the halogen-containing polymer itself or the halogen-free polymer as the precursor thereof may be crystalline or amorphous.

Although the halogen-containing polymer used for the graft copolymerization in accordance with the present invention is not specifically restricted for its molecular weight, it has preferably a number average molecular weight in the range of 1,000 or more, more preferably 2,000 or more, still more preferably 3,000 or more, from the viewpoint of the physical properties or performances of the graft copolymer obtained. If the halogen-containing polymer used has a number average molecular weight below 1,000, it may have a problem that the backbone chain would not exhibit the properties as a polymer or a resin. In this connection, the halogen-containing polymer used is not restricted for the upper limit of its molecular weight and thus includes those which are crosslinked where the molecular weight may be infinite.

Specific examples of the halogen-containing polymers used in the present invention include (a) halogenated olefins of 2 to 10 carbon atoms such as chlorinated polypropylenes or chlorinated polyethylenes; polyvinyl chlorides, chlorinated polyvinyl chlorides, polyvinylidene chlorides, poly(tetrafluoroethylene), poly(trifluoroethylene), poly(difluoroethylene), poly(trifluoromonochloroethylene), polychloroprene, poly(1-chlorobutadiene-butadiene) or further halogenated derivatives thereof, (b) halogenated products of thermoplastic resins such as ionomer resins, AAS resins, AES resins, AS resins, MBS resins, ethylene-vinyl chloride copolymer resins, ethylene-vinyl acetate copolymers, (ethylene-vinyl acetate)-vinyl chloride graft copolymers, polyvinyl acetates, phenoxy resins, polybutadienes, polyacetals, polyamides, polyamidimides, polyallylates, polyimides, polyether ether ketones, polyethylene terephthalates, polycarbonates, polystyrenes, polysulfones, polyphenylene ethers, polyphenylene sulfites, polybutylene terephthalates, polymethyl methacrylates, polymethyl terpenes and the like; (c) halogenated products of thermosetting resins such as guanamine resins, diallylphthalate resins, vinyl ester resins phenol resins unsaturated polyester resins, furan resins, polyurethanes, melamine resins, urea resins and the like; (d) halogenated derivatives of resins for adhesives or paints such as isobutylene-maleic anhydride copolymer resins, epoxy resins, xylene resins, coumarone resins, ketone resins, vinyl propionate resins, polyethylene oxides, polyterpenes, polyvinyl alcohols, polyvinyl ethers, polyvinyl butyrals, polyvinyl formals, maleic acid resins, resorcinol resins, carboxyvinyl resins and the like; (e) halogenated products of rubbers such as styrene-butadiene rubbers, butadiene rubbers, isoprene rubbers, ethylene-propylene rubbers, ethylene-propylene-diene rubbers, nitrile-butadiene rubbers, chloroprene rubbers, butyl rubbers, urethane rubbers, silicone rubbers, Thiokols, fluorine rubbers, acrylic rubbers, chlorosulfonated polyethylene, epichlorohydrin rubbers, propylene oxide rubbers, ethylene-vinyl acetate rubbers, ethylene-acrylic acid rubbers, norbornene rubbers, styrene-isoprene rubbers and the like; and (f) halogenated products of silicones, cellulose derivatives, polyglutamic acids and the like.

Among these polymers, the ones which enjoy best the advantages of the present invention are halogenated polyolefins among the group (a), preferably halogenated poly($C_2$–$C_{10}$ olefins), more preferably chlorinated poly($C_2$–$C_4$ olefins), because the inert polyolefins are modified by the graft copolymerization of the present invention.

The polymerization-initiating site for the monomer is a site where a halogen atom is attached to a trunk polymer and thus the molecular structure of the resulting graft copolymer depends on where the site of the halogen atom on the halogen-containing polymer is. Therefore, a graft copolymer having branch polymers as the side chains is obtained from the halogen-containing polymer for the backbone having halogen atoms dispersed along the molecular chain. An AB type block copolymer can be synthesized with a halogen-containing polymer used having halogens at its terminus, and an ABA type block copolymer can be synthesized with a halogen-containing polymer used having halogens at its termini. The production of these copolymers may be regarded as the special cases of the process of the present invention.

While the halogen-containing polymer used may be solid or liquid, the polymer in the form of solid is preferably in the shape of particles having a particle size as small as possible, because the ethylenically unsaturated monomer can be readily impregnated into the halogen-containing polymer mass.

Reducing agent

As the reducing agent which can be used in the present invention, any compounds having reducing activity can be used.

However, the preferred reducing compounds are soluble dithionous acid and its salts and soluble phosphinic acid and its salts. Among these compounds, alkali metal dithionites, above all the sodium salt ($Na_2S_2O_4$), and alkali metal phosphinates, above all the sodium salt ($Na_2PH_2O_2$), particularly sodium dithionite are preferred.

The reducing agent is preferably used in an amount of 0.1–50 parts by weight, more preferably of 0.5–20 parts by weight, still more preferably 1–10 parts by weight, per 100 parts by weight of the halogen containing polymer used. The reducing agent in an amount less than the aforementioned range shows substantially no graft reaction. The reducing agent in an amount exceeding the range not only is of no use because it will increase the reaction rate no more but also may cause the problem in quality due to its adhesion onto the surface of the graft copolymer recovered.

Phase Transfer Catalyst

The phase transfer catalyst to be combined with the aforementioned reducing agent is an onium compound or an ionophore compound.

(1) Onium Compound

As the typical onium compounds, there can be mentioned quaternary ammonium compounds and quaternary phosphonium compounds.

(a) Quaternary alkyl or aralkyl ammonium compounds

As the quaternary ammonium compounds, there can be mentioned quaternary compounds of alkyl or aralkylamines such as the quaternary ammonium salt represented by the formula (1) as a specific example:

$$R^1{}_3N^+R^2X^- \tag{1}$$

wherein $R^1$ represents an alkyl group having 1–10 carbon atoms, $R^2$ represents an alkyl group having 1–5 carbon atoms or a benzyl group, and $X^-$ represents a chloride anion, a bromide anion, an iodide anion or $HSO_4^-$.

Another specific example of the quaternary ammonium compound includes the quaternary pyridinium or picolinium salt represented by the formula:

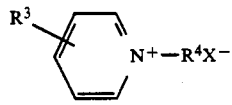
(2)

where $R^3$ represents a hydrogen atom or a methyl group, $R^4$ represents an alkyl group having 1–18 carbon atoms or a benzyl group, and $X^-$ has the same meaning as defined above.

(b) Quaternary phosphonium compound

As the specific example of the quaternary phosphonium compound, there can be mentioned the quaternary phosphonium salt represented by the formula $$R^5{}_4P^+X^- \tag{3}$$

wherein $R^5$ represents an alkyl group having 1–10 carbon atoms and $X^-$ has the same meaning as defined above.

(2) Ionophore Compound

Another group of the phase transfer catalysts used in the present invention is an ionophore compound. Specifically, there can be mentioned ionophore compounds such as crown ethers, azacrowns, thiacrowns, cryptands and the like. For the detail of these crown compounds and cryptans, reference may be made to R. M. Izatt & J. J. Christensen: SYNTHETIC MULTIDENTATE MACROCYCLIC COMPOUNDS, Academic Press, N. Y., 1978.

The phase transfer catalyst in the present invention is preferably a quaternary ammonium salt, particularly a quaternary ammonium halide salt. The phase transfer catalyst can be used preferably in an amount of 0.1–50 parts by weight, more preferably 0.2–20 parts by weight, still more preferably 0.5–10 parts by weight to 100 parts by weight of the halogen-containing polymer used. The phase transfer catalyst in an amount less than the aforementioned range shows substantially no graft reaction. The phase transfer catalyst in an amount exceeding the range not only is of no use because it will increase the reaction rate no more but also may cause the problem in quality due to its adhesion onto the surface of the graft copolymer recovered.

Ethylenically Unsaturated Monomer

In the graft copolymer according to the present invention, any ethylenically unsaturated monomers to form "branches", which have a radically polymerizable and ethylenically unsaturated double bond, can be used.

In the present invention, one or more of these monomers can be appropriately used. As the ethylenically unsaturated monomers used, there are mentioned, for example, (a) aromatic monovinyl monomers such as nucleus-and/or side chain-substituted styrenes wherein the substituent may be a lower alkyl of 1 to 4 carbon atoms which may or may not be halogenated, a halogen atom, and amino group and the like such as styrene, p-chloromethylstyrene, o-aminostyrene, α-methylstyrene and the like; (b) (meth)acrylic monomers such as acids, esters having 1 to 20 carbon atoms in the "alkyl" which may or may not be halogenated, hydroxylated or oxygenated, nitriles or amides such as (meth)acrylic acid, methyl (meth)acrylate, ethyl (meth)acrylate, n-butyl (meth)acrylate, i-butyl (meth)acrylate, t-butyl (meth)acrylate, 2-ethylhexyl (meth)acrylate, n-octyl (meth)acrylate, i-octyl (meth)acrylate, 1-methylheptyl (meth)acrylate, n-nonyl (meth)acrylate, perfluoroethyl (meth)acrylate, hydroxyethyl (meth)acrylate, glycidyl (meth)acrylate, (meth)acrylonitrile, (meth)acrylamide and the like; (c) vinyl halides such as vinyl chloride and the like; (d) vinylidene halides such as vinylidene chloride and the like; and (e) miscellaneous unsaturated monomers such as vinyl acetate, isobutylene, vinylidene cyanide, vinylpyrrolidone, vinylpyridine, N-vinylcarbazole, methyl vinyl ketone, vinyl isocyanate, maleic anhydride, N-substituted maleimides and the like. Furthermore, there are mentioned macromonomers having a radically polymerizable vinyl group in the molecule and a backbone comprising styrene, (meth)acrylates, polysiloxane and the like.

In this connection, the terms "(meth)acrylic" and "(meth)acrylate" described herein are the generic names of acrylic and methacrylic and acrylate and methacrylate, respectively, and the term "(meth)acryloxy" is the generic name of acryloxy and methacryloxy.

Polymerization

The graft polymerization of the present invention is considered to be initiated by the mechanism in which an anion dissociated from the reducing agent together with the phase transfer catalyst forms a complex, which attacks the halogen site in the halogen-containing polymer and extracts the halogen atom to generate a polymer radical, which in turn acts as a polymer initiator to initiate polymerization of an ethylenically unsaturated monomer grafting onto the polymer. However, the present invention is not restricted by such a theory. The halogen radical extracted may transfer to a cation derived from the phase transfer catalyst and regenerate the phase transfer catalyst. Thus, the amount of the phase transfer catalyst may always be maintained at a constant level. A series of these reactions is believed to form a radical polymerization of redox type in nature.

If the aforementioned reaction mechanism is conducted, the graft polymerization of the present invention can be conducted in any reaction profile. In general, water or a polar solvent such as an alcohol, dimethylformamide or dimethylsulfoxide is preferably used in at least a certain amount in order to accelerate ion dissociation, and water is the most preferable solvent from the viewpoint of hygiene, easy post-treatment of polymerization and cost. In other words, graft polymerization is preferably carried out in such a way that the halogen-containing polymer (preferably in the form of powder) and the ethylenically unsaturated monomer are dispersed into an aqueous solvent, that is, water alone or a mixture of a water-soluble polar solvent and water and the monomer is impregnated into the halogen-containing polymer. In this case, the medium is used preferably in an amount equal to or more than the total weight of the halogen-containing polymer and the ethylenically unsaturated monomer, more preferably in a proportion of about 2-5 times to the total weight.

The polymerization medium can be such that the polar solvent described above is in combination with a non-halogenated organic solvent which helps the swelling of the halogen polymer such as toluene, xylene, heptane, cyclohexane or ethyl acetate.

Although air can be used as a polymerization atmosphere without serious inhibitory effect against polymerization, it is preferable to use an inert gas such as nitrogen, argon or carbon dioxide as a polymerization atmosphere. The polymerization temperature depends on the polymerization activities and the stabilities of the ethylenically unsaturated monomers used and generally ranges preferably at 0°-150° C., more preferably 10°-130° C., still more preferably 20°-100° C. Polymerization proceeds at an unsatisfactorily low reaction rate at a temperature lower than the above range, while by-reactions are not negligible and deterioration in quality of the polymer is apt to occur at a temperature exceeding the range.

Polymerization is preferably carried out with stirring to avoid the agglomeration of the halogen-containing polymer particles in consideration of the easy recovery and the post-treatment. In this case, a halogen-free dispersion stabilizer such as a polyvinyl alcohol, a surfactant or a sparingly soluble salt can be used to prevent the agglomeration. It is also possible to use a halogen-free chain transfer agent or a molecular weight modifier such as n-butylmercaptan, α-methylstyrene dimer or the like in order to prevent the crosslinking or the increase of molecular weight of the polymer.

It is also possible to synthesize a "multi-graft copolymer" in which different branch chains are grafted onto the same backbone by conducting the grafting reaction according to the present invention on a portion of the halogen atoms in the halogen-containing polymer and subsequently grafting an ethylenically unsaturated monomer different from the one used in the first reaction in the residual halogen atoms in the graft copolymer obtained.

Although the weight ratio of the halogen-containing polymer and the ethylenically unsaturated monomer used in the present invention is not critical for reaction, the ratio of $$\frac{\text{(weight of the halogen-containing polymer)}}{\text{(weight of ethylenically unsaturated monomer)}}$$

is preferably in the range of 0.05-20, more preferably 0.1-10, still more preferably 0.2-5, in consideration of the physical properties and the performances of the graft copolymer obtained. If the copolymer has the ratio less than 0.05, the halogen-containing polymer backbone is buried into many branch chains and often could not exhibit the property as the backbone. On the other hand, the copolymer has the ratio exceeding 20, it could often cause the problem that the branch chain is too short to exhibit sufficiently the properties as the polymer of the branch chain.

The present invention is further described in detail with reference to the following examples, but it should not be construed to be limited thereto. In this connection, percentage in Examples is by weight unless otherwise specified.

EXAMPLE 1

In an oil bath equipped with a temperature control device were placed a 1-liter separable flask equipped with a capillary tube for introducing gas, a stirrer, a thermometer and a condenser. Into the flask were charged 200 g of distilled water and 50 g of low chlorinated polypropylene powder having a chlorine content of 2.6%, a number average molecular weight of $3.2 \times 10^4$ and a weight average molecular weight of $14.0 \times 10^4$, and 30 g of methyl methacrylate was added with vigorous stirring under nitrogen atmosphere. The mixture was heated to a temperature of 80° C. and maintained at the same temperature over a period of 3 hours. The mixture was then cooled to 60° C., and 1.5 g of sodium dithionite and 1.5 g of tetrabutylammonium bromide were added to the mixture. After the resulting mixture was maintained at the same temperature for 8 hours, it was cooled to room temperature, and the solid matter was collected by filtration, washed twice with 1 liter of water. Then, the washing water was again filtered to give the solid matter. After the solid matter thus recovered was dried in a vacuum drier maintained at a temperature of 60° C. for 20 hours, and the weight of the solid matter was measured to calculate the monomer conversion, the average molecular weight and the graft ratio.

The results are shown in Table 1.

In the table, the term "average molecular weight" means the average molecular weight in terms of styrene and the term "graft copolymer fraction" means the percentage of the graft copolymer contained in the total product polymer which was calculated by subtracting the weight of homopolymers in the product polymer extracted by the Soxhlet's extraction method from the total product polymer.

When the graft copolymer was observed under a scanning electron microscope for its microstructure, a microdomain structure having a domain diameter of 1 μm or less was observed. When the scanning electron microscopic observation of the graft copolymers obtained in Examples 2-18 was repeated in the same manner as above, a microdomain structure having a domain diameter of 1 μm or less was observed in all of the copolymers.

EXAMPLE 2

The reaction was carried out in the same manner as in Example 1 except that 50 g of a low-chlorinated polypropylene powder was replaced by 50 g of a high-chlorinated polypropylene having a chlorine content of 42.2%, a number average molecular weight of $3.6 \times 10^4$ and a weight average molecular weight of $14.8 \times 10^4$.

The results are shown in Table 1.

EXAMPLE 3

The reaction was carried out in the same manner as in Example 1 except that 50 g of a low-chlorinated polypropylene powder was replaced by 50 g of a low-chlorinated low-density polyethylene having a chlorine content of 3.0%, a number average molecular weight of $3.5 \times 10^4$ and a weight average molecular weight of $7.7 \times 10^4$.

The results are shown in Table 1.

EXAMPLE 4

The reaction was carried out in the same manner as in Example 1 except that 50 g of a low-chlorinated polypropylene powder was replaced by 50 g of a high-chlorinated low-density polyethylene having a chlorine content of 35.0%, a number average molecular weight of $3.2 \times 10^4$ and a weight average molecular weight of $7.6 \times 10^4$.

The results are shown in Table 1.

EXAMPLE 5

The reaction was carried out in the same manner as in Example 1 except that 50 g of a low chlorinated polypropylene powder was replaced by 50 g of a polyvinyl chloride powder having a number average molecular weight of $2.5 \times 10^4$ and a weight average molecular weight of $5.1 \times 10^4$.

The results are shown in Table 1.

EXAMPLE 6

The reaction was carried out in the same manner as in Example 1 except that 50 g of a low-chlorinated polypropylene powder was replaced by 50 g of a polyvinylidene chloride powder having a number average molecular weight of $2.6 \times 10^4$ and a weight average molecular weight of $5.4 \times 10^4$.

The results are shown in Table 1.

EXAMPLE 7

The reaction was carried out in the same manner as in Example 1 except that 50 g of a low-chlorinated polypropylene powder was replaced by 50 g of a poly (trifluoromonochloroethylene) powder having a number average molecular weight of $1.2 \times 10^4$ and a weight average molecular weight of $2.5 \times 10^4$.

The results are shown in Table 1.

EXAMPLE 8

The reaction was carried out in the same manner as in Example 1 except that 50 g of a low-chlorinated polypropylene powder was replaced by 50 g of a low-brominated polypropylene powder having a bromine content of 5.9%, a number average molecular weight of $3.2 \times 10^4$ and a weight average molecular weight of $14.0 \times 10^4$.

The results are shown in Table 1.

EXAMPLE 9

The reaction was carried out in the same manner as in Example 1 except that 50 g of a low-chlorinated polypropylene powder was replaced by 50 g of a high-brominated polypropylene powder having a bromine content of 31.0%, a number average molecular weight of $3.2 \times 10^4$ and a weight average molecular weight of $14.0 \times 10^4$.

The results are shown in Table 1.

EXAMPLE 10

The reaction was carried out in the same manner as in Example 1 except that 1.5 g of sodium dithionite was replaced by 1.5 g of sodium phosphinate.

The results are shown in Table 1.

EXAMPLE 11

The reaction was carried out in the same manner as in Example 1 except that 1.5 g of tetrabutylammonium bromide was replaced by 1.5 g of trioctylmethylammonium chloride.

The results are shown in Table 1.

EXAMPLE 12

The reaction was carried out in the same manner as in Example 1 except that 1.5 g of tetrabutylammonium bromide was replaced by 1.5 g of benzyltriethylammonium chloride.

The results are shown in Table 1.

EXAMPLE 13

The reaction was carried out in the same manner as in Example 1 except that 1.5 g of tetrabutylammonium bromide was replaced by 1.5 g of tetrabutylammonium hydrogen sulfate.

The results are shown in Table 1.

EXAMPLE 14

The reaction was carried out in the same manner as in Example 1 except that 1.5 g of tetrabutylammonium bromide was replaced by 1.5 g of lauryl-4-picolinium chloride.

The results are shown in Table 1.

EXAMPLE 15

The reaction was carried out in the same manner as in Example 1 except that 30 g of methyl methacrylate was replaced by 30 g of styrene.

The results are shown in Table 1.

EXAMPLE 16

The reaction was carried out in the same manner as in Example 1 except that 30 g of methyl methacrylate was replaced by 30 g of butyl acrylate.

The results are shown in Table 1.

EXAMPLE 17

The reaction was carried out in the same manner as in Example 1 except that 30 g of methyl methacrylate was replaced by 15 g of methyl methacrylate.

The results are shown in Table 1.

EXAMPLE 18

The reaction was carried out in the same manner as in Example 1 except that 30 g of methyl methacrylate was replaced by 100 g of methyl methacrylate.

The results are shown in Table 1.

COMPARATIVE EXAMPLE 1

When the reaction was conducted in the same manner as in Example 1 except that sodium dithionite was not used, it was found that grafting reaction did not proceed at all.

COMPARATIVE EXAMPLE 2

When the reaction was conducted in the same manner as in Example 1 except that tetrabutylammonium bromide was not used, it was found that grafting reaction did not proceed at all.

TABLE 1

| Example | Yield | Monomer Conversion (%) | Average Molecular Weight | | Graft Copolymer Fraction (%) |
|---|---|---|---|---|---|
| | | | Number av. | Weight av. | |
| 1 | 78.8 | 96.0 | $5.0 \times 10^4$ | $22.7 \times 10^4$ | 72.1 |
| 2 | 79.0 | 96.7 | $5.6 \times 10^4$ | $23.9 \times 10^4$ | 72.0 |
| 3 | 78.7 | 95.7 | $5.6 \times 10^4$ | $12.5 \times 10^4$ | 71.6 |
| 4 | 78.8 | 96.0 | $5.1 \times 10^4$ | $12.6 \times 10^4$ | 71.8 |
| 5 | 78.8 | 96.0 | $3.9 \times 10^4$ | $8.7 \times 10^4$ | 70.5 |
| 6 | 77.8 | 92.7 | $4.1 \times 10^4$ | $8.6 \times 10^4$ | 70.6 |
| 7 | 77.0 | 90.0 | $1.9 \times 10^4$ | $4.2 \times 10^4$ | 68.9 |
| 8 | 78.7 | 95.7 | $5.1 \times 10^4$ | $22.5 \times 10^4$ | 72.1 |
| 9 | 78.9 | 96.3 | $5.0 \times 10^4$ | $23.0 \times 10^4$ | 71.9 |
| 10 | 78.6 | 95.3 | $5.0 \times 10^4$ | $22.8 \times 10^4$ | 71.5 |
| 11 | 78.7 | 95.7 | $5.0 \times 10^4$ | $22.7 \times 10^4$ | 72.0 |
| 12 | 78.0 | 93.3 | $4.9 \times 10^4$ | $22.6 \times 10^4$ | 71.9 |
| 13 | 78.1 | 93.7 | $5.0 \times 10^4$ | $22.9 \times 10^4$ | 70.9 |
| 14 | 78.0 | 93.3 | $4.9 \times 10^4$ | $22.8 \times 10^4$ | 71.1 |
| 15 | 75.5 | 85.0 | $4.7 \times 10^4$ | $22.0 \times 10^4$ | 68.1 |
| 16 | 77.9 | 93.0 | $5.0 \times 10^4$ | $22.8 \times 10^4$ | 69.9 |
| 17 | 64.6 | 97.3 | $4.1 \times 10^4$ | $18.5 \times 10^4$ | 73.0 |
| 18 | 194.4 | 94.4 | $9.4 \times 10^4$ | $44.2 \times 10^4$ | 65.5 |

As described above, the graft copolymer can be produced in a high graft copolymer fraction typically by emulsion polymerization or suspension polymerization.

What is claimed is:

1. A process for preparing a graft copolymer comprising grafting an ethylenically unsaturated monomer onto a halogen-containing polymer dispersed in a polar solvent in the presence of 0.1 to 50 parts by weight, per 100 parts by weight of the halogen-containing polymer used, of a reducing agent and 0.1 to 50 parts by weight, per 100 parts by weight of the halogen-containing polymer used, of a phase transfer catalyst selected from the group consisting of onium compounds and ionophore compounds, whereby a polymerization system is formed by the reaction of the halogen-containing polymer with the reducing agent and the phase transfer catalyst so that free radicals are generated on the halogen-containing polymer thereby to polymerize said monomer by the free radicals so formed to be grafted onto the halogen-containing polymer, said polymerization being conducted at a temperature of from about 0° to about 150° C., the ratio of the weight of the halogen-containing polymer to the weight of the ethylenically unsaturated monomer being in the range of 0.05-20.

2. The process for preparing a graft copolymer according to claim 1, wherein said reducing agent is soluble dithionous acid or a salt thereof or soluble phosphinic acid or a salt thereof.

3. The process for preparing a graft copolymer according to claim 1, wherein said onium compound as the phase transfer catalyst is a quaternary alkyl or aralkylammonium salt or a quaternary pyridinium or picolinium salt.

4. The process for preparing a graft copolymer according to claim 1, wherein said polar solvent is an aqueous solvent.

5. The process for preparing a graft copolymer according to claim 1, wherein the halogen content of said halogen-containing polymer is at least 0.1% by weight calculated as a chlorine atom.

6. The process for preparing a graft copolymer according to claim 1, wherein the halogen of said halogen-containing polymer is chlorine or bromine.

7. The process for preparing a graft copolymer according to claim 1, wherein said halogen-containing polymer is a halogenated poly($C_2$–$C_{10}$ olefin).

* * * * *